3,073,829
Patented Jan. 15, 1963

United States Patent Office 3,073,829
3-HYDROXY-3-[(MONOCARBOCYCLIC ARYL) HYDROXYMETHYL] TROPANES AND PREPARATION THEREOF
Sydney Archer, Bethlehem, and Malcolm R. Bell, North Greenbush, N.Y., assignors to Sterling Drug Inc., New York, N.Y., a corporation of Delaware
No Drawing. Original application Apr. 30, 1958, Ser. No. 731,857. Divided and this application Jan. 8, 1960, Ser. No. 1,388
11 Claims. (Cl. 260—292)

The invention here resides in the concept of compositions of matter having a molecular structure in which a carboxy group and a monocarbocyclic aryl group are separately attached to the 3-position ring carbon atom of a tropane nucleus; and, in processes for physically embodying such concept including the chemical intermediates of the sequence of operations leading to the said final product.

A particular aspect of the invention relates to compounds having the formula

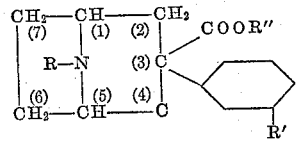

I wherein R represents hydrogen, a lower-aliphatic hydrocarbon, monocarbocyclic aryl substituted lower-alphatic hydrocarbon, or a monocarbocyclic arylamino substituted lower-aliphatic hydrocarbon radical, R' represents hydrogen, a lower-alkoxy radical, the hydroxy radical or a carboxylic acyloxy radical, and R" represents a lower-alkyl radical.

In the above general Formula I, R represents a hydrogen atom or a substituent selected from lower-aliphatic hydrocarbon, monocarbocyclic aryl substituted lower-aliphatic hydrocarbon, and monocarbocyclic arylamino substituted lower-aliphatic hydrocarbon radicals. When R stands for a lower-alphatic hydrocarbon radical it represents saturated or unsaturated radicals, i.e., lower-alkyl, lower-alkenyl, or lower-alkynyl having from one to about eight carbon atoms, such as methyl, ethyl, propyl, isopropyl, butyl, tertiary-butyl, hexyl, octyl, vinyl, 1-propenyl, 2-propenyl (allyl), 2-butenyl, ethynyl, propargyl, and the like.

When R represents a monocarbocyclic aryl substituted lower-aliphatic hydrocarbon radical, it stands for the same type of lower-aliphatic radicals as described above substituted by a phenyl radical or a phenyl radical having one or more substituents such as hydroxy, fluoro, chloro, bromo, iodo, nitro, amino, lower-alkoxy, lower-alkylamino or lower-carboxylic acylamino. A preferred class of monocarbocyclic aryl radicals comprises phenyl and phenyl substituted by from one to three substituents selected from hydroxy, fluoro, chloro, bromo, iodo, nitro, amino, lower-alkoxy, lower-alkylamino and lower-carboxylic acylamino. Thus, R can represent such groups as benzyl, 2-phenylethyl, 3-phenylpropyl, cinnamyl, p-aminophenethyl, p-methoxyphenethyl, p-chlorophenethyl, 3,4,5-trimethoxyphenyl, and the like.

When R represents a monocarbocyclic arylamino substituted lower-aliphatic hydrocarbon radical, the monocarbocyclic aryl and lower-hydrocarbon moieties have the same meanings as given above, but are separated by an imino grouping, —NH—, and R in this instance represents such groups as 2-phenylaminoethyl, 3-phenylaminopropyl, 3-phenylamino-2-propenyl, 2-(p-aminophenylamino)ethyl, and the like.

In the above general Formula I, R' represents a hydrogen atom or a lower-alkoxy, hydroxy or carboxylic acyloxy radical. The lower-alkoxy radicals have preferably from one to about four carbon atoms, thus including such radicals as methoxy, ethoxy, propoxy, isopropoxy, butoxy, and the like. The carboxylic acyloxy radicals are preferably derived from carboxylic acids having from one to about ten carbon atoms, and having a molecular weight less than about 250. Representative of the acryl radicals which can be present are lower-alkanoyl radicals, e.g., formyl, acetyl, propionyl, butyryl, isobutyryl, caproyl, heptanoyl, octanoyl, decanoyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; and monocarbocyclic aryl-lower-alkanoyl or -alkenoyl radicals, such as phenylacetyl, β-phenylpropionyl, cinnamoyl, and the like.

In the above general Formula I, R" represents a hydrogen atom or a lower-alkyl radical, the latter having preferably from one to about six carbon atoms, thus including such radicals as methyl, ethyl, propyl, isopropyl, butyl, isobutyl, pentyl, hexyl, and the like.

The preparation of the compounds of the invention is delineated by the following flow-sheet:

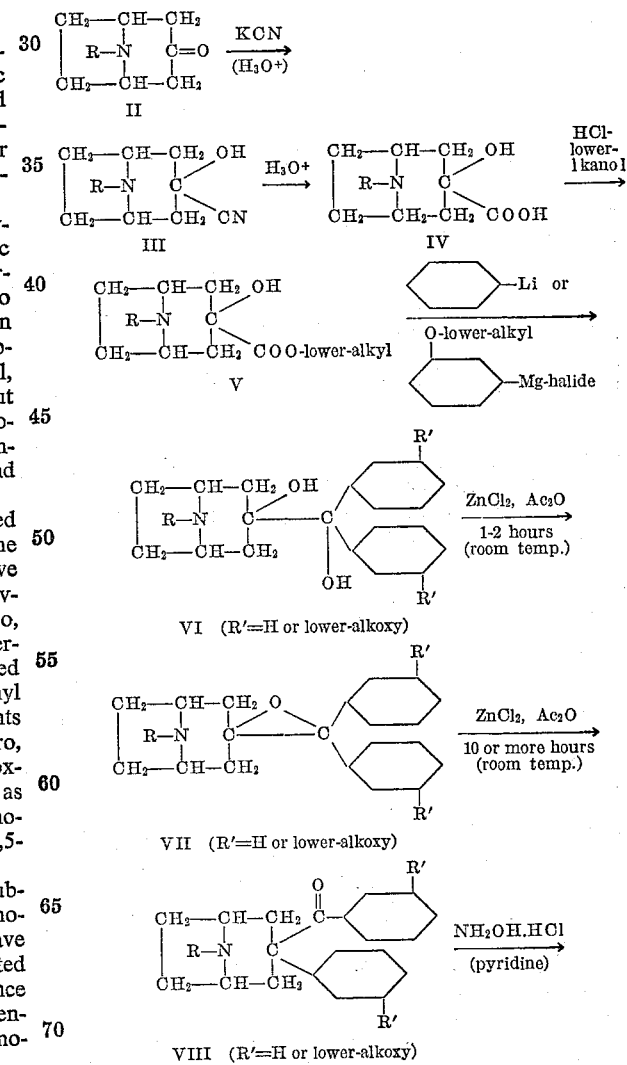

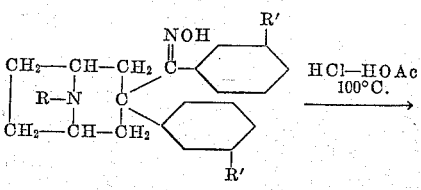

IX (R'=H or lower-alkoxy)

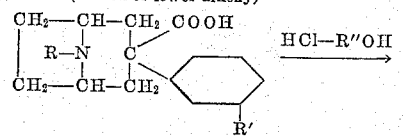

X (R'=H or lower-alkoxy)

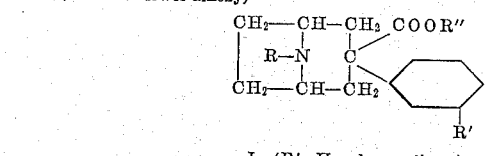

I (R'=H or lower-alkoxy)

An 8-R-nortropan-3-one (II) is treated with hydrogen cyanide to give the cyanohydrin, 3-hydroxy-3-cyano-8-R-nortropane (III). The latter is hydrolyzed in acid medium to the corresponding carboxylic acid, 3-hydroxy-3-carboxy-8-R-nortropane (IV). The acid (IV) is esterified with a lower-alkanol under acid conditions to the lower-alkyl ester, 3-hydroxy-3-carbo-lower-alkoxy-8-R-nortropane (V).

The hydroxy ester (V) is subjected to reaction with phenyllithium or a monocarbocyclic arylmagnesium halide, e.g., phenylmagnesium halide, or a 3-lower-alkoxy derivative thereof, and the intermediate organometallic complex is hydrolyzed to produce a 3-hydroxy-3-[bis-(monocarbocyclic aryl)hydroxymethyl]-8-R-nortropane (VI). The reaction is carried out under anhydrous conditions in an inert solvent such as ether, benzene, toluene of the like, and takes place at room temperatures, although gentle heating may be applied if desired to accelerate the reaction.

The glycol (VI) when treated at room temperature with zinc chloride and acetic anhydride first dehydrates to give an epoxide of a 3-bis(monocarbocyclic aryl)methylene-8-R-nortropane (VII) and then rearranges to a 3-(monocarbocyclic aryl)-3-(monocarbocyclic aroyl)-8-R-nortropane (VIII). The epoxide (VII) can be isolated if the reaction mixture is worked up after about one to two hours, whereas rearrangement to the ketone (VIII) is essentially complete if the reaction mixture is allowed to stand for at least about ten hours before working up.

The next step is the conversion of the ketone (VIII) to its oxime, a 3-(monocarbocyclic aryl)-3-(α-isonitroso-monocarbocyclic arylmethyl)-8-R-nortropane (IX) which is accomplished by heating the ketone with an acid-addition salt of hydroxylamine in the presence of a base. Preferred bases are weak organic bases such as pyridine and the reaction is carried out in an inert solvent such as ethanol, at a temperature between about 50° C. and 150° C., in which case the oxime is obtained directly in the form of its acid-addition salt.

The conversion of the oxime (IX) to a 3-(monocarbocyclic aryl)-3-carboxy-8-R-nortropane (X) is effected by heating a solution of the oxime in acetic acid saturated with dry hydrogen chloride at a temperature between about 50° C. and 150° C. The transformation involves a Beckmann rearrangement followed by cleavage of the intermediate anilide having the grouping —CONHC$_6$H$_4$R' in the 3-position, as confirmed by the isolation of aniline from the reaction mixture in the case where R' is H.

The final step is an esterification of the acid (X) by treating it with a lower-alkanol in the presence of a strong acid, giving a 3-(monocarbocyclic aryl)-3-(carbo-lower-alkoxy)-8-R-nortropane (I). The esterification takes place at room temperature or above.

The ketones of Formula VIII can be reduced catalytically or with lithium aluminum hydride to produce the corresponding hydroxy compounds, 3-(monocarbocyclic aryl)-3-(monocarbocyclic aryl-hydroxymethyl)-8-R-nortropanes (XI)

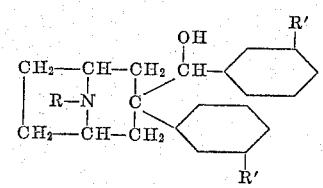

XI

The compounds of Formula XI in the form of their acid-addition or quaternary ammonium salts are useful as anticholinergic agents.

An alternative approach to the compounds of the invention of Formula I is set forth in the following flow-sheet (R''' represents a lower-alkyl radical and R has the meaning given above):

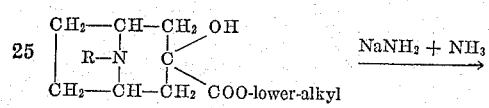

V

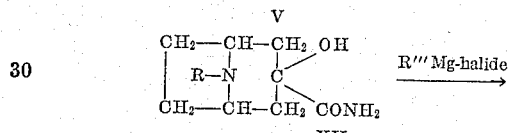

XII

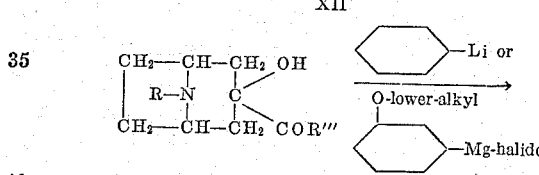

XIII

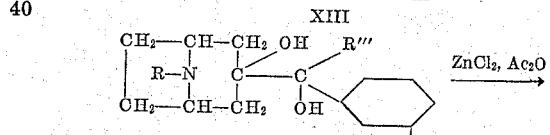

XIV (R'=H or lower-alkoxy)

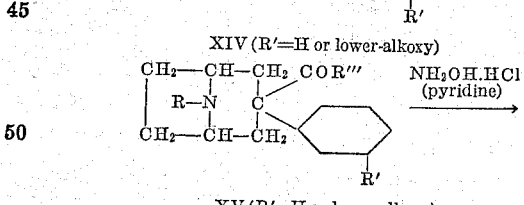

XV (R'=H or lower-alkoxy)

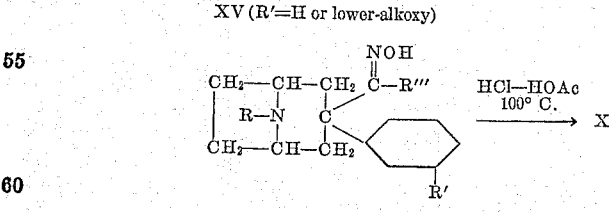

XVI (R'=H or lower-alkoxy)

A 3-hydroxy-3-carbo-lower-alkoxy-8-R-nortropane of structure V is converted to the corresponding amide, 3-hydroxy-3-carbamyl-8-R-nortropane (XII), by treating with sodium amide in liquid ammonia. The amide XII is then subjected to a Grignard reaction with a lower-alkylmagnesium halide, the reaction stopping readily at the ketone stage to give a 3-hydroxy-3-lower-alkanoyl-8-R-nortropane (XIII). The latter is then subjected to a second Grignard reaction with phenyllithium, phenylmagnesium halide or a 3-lower-alkoxyphenylmagnesium halide to produce a 3-hydroxy-3-[lower-alkyl(monocarbocyclic aryl)hydroxymethyl]-8-R-nortropane (XIV). The structure XIV belongs to the same class of compounds as structure VI and they can be represented by a single formula as follows:

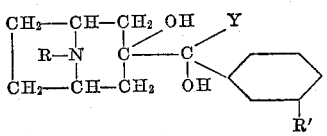

XVII wherein R' represents hydrogen or a lower-alkoxy radical, Y represents a lower-alkyl or 3-R' phenyl radical, and R has the same meaning as given above.

The diol XIV is then converted to the desired 3-(monocarbocyclic aryl)-3-lower-alkanoyl-8-R-nortropane (XV) by treatment with zinc chloride and acetic anhydride at room temperature for ten or more hours, analogously to the conversion of VI (or VII) to VIII. The structure XV belongs to the same class of compounds as structure XVIII and they can be represented by a single formula as follows:

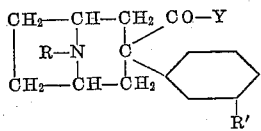

XVIII wherein R' represents hydrogen or a lower-alkoxy radical, Y represents a lower-alkyl or 3-R'-phenyl radical and R has the same meaning as given above.

The ketone XV is then converted to its oxime, a 3-(monocarbocyclic aryl)-3-(1-isonitroso-lower-alkyl)-8-R-nortropane (XVI), by treatment with hydroxylamine, analogously to the conversion of VIII to IX. The structure XVI belongs to the same class of compounds as structure IX and they can be represented by a single formula as follows:

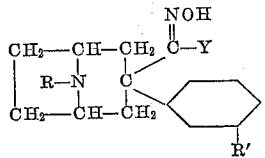

XIX wherein R' represents hydrogen or a lower-alkoxy radical, Y represents a lower-alkyl or a 3-R'-phenyl radical, and R has the same meaning as given above.

The oxime XVI is then subjected to the Beckmann rearrangement by heating it with hydrochloric and acetic acid at about 100° C., analogously to the conversion of IX to X, and the structure X is again produced.

The ketones of Formulas VIII and XV, wherein R represents hydrogen or the methyl radical, when in the form of their acid-addition salts exist largely in the tautomeric carbinolamine form, viz.:

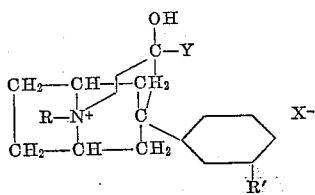

The foregoing structure was established from consideration of the infrared spectra of said ketones. In the case of compounds wherein R is hydrogen, the free bases can also exist in the carbinolamine form. Although the compounds of Formulas VIII and I are named and their structure depicted as ketones throughout this description, it is to be understood that the carbinolamine tautomeric forms are also contemplated as part of the invention.

The compounds of the invention of Formula I wherein R represents an organic radical can be prepared from the compounds wherein R represents hydrogen by reacting the latter with a halide, R—X, wherein X is halogen, in the presence of a basic condensing agent, or acid-acceptor, such as sodium carbonate, sodium methoxide, sodium amide, sodium hydride, or the like. This N-alkylation procedure can be effected at any stage in the synthesis, but preferably upon compounds I or V (R=H).

The compounds of the invention wherein R represents hydrogen can be prepared directly from nortropinone (II, R=H) according to the above flow-sheet. Alternatively, they can be prepared by reacting a compound wherein R is methyl with cyanogen bromide and then treating the resulting N-cyano compound with acid or base.

The compounds of Formulas I, VIII, X and XV wherein R' is a hydroxy radical are prepared by dealkylation of the corresponding compounds wherein R' is a lower-alkoxy radical. The dealkylation is carried out by heating the alkoxy compound with hydrogen bromide or hydrogen iodide in water or acetic acid solution, or with pyridine hydrochloride or hydrobromide at about 200° C. If a compound of Formula I where R' is hydroxy or acyloxy is desired, the dealkylation is preferably carried out on a compound of Formulas VIII, X or XV where R' is lower-alkoxy, and the resulting phenolic compound carried through the necessary subsequent steps to produce I (R' is OH). The compounds wherein R' is a carboxylic acyloxy radical are prepared by esterifying the compounds wherein R' is hydroxy by reacting the latter with the appropriate acid anhydride or acid halide.

The compounds of Formulas VI to X, inclusive, XII to XVI, inclusive, and I can exist in two stereochemical forms depending upon the spatial arrangement of the groups at $C_3$ with respect to the remainder of the molecule. The sequence of steps shown in the first flow-sheet leads to compounds which will be designated the "β-series." The other stereochemical series, to be designated the "α-series" can be reached by treating the glycol VI with acetic anhydride in the absence of zinc chloride which leads to the epoxide VII of the α-series. The epoxide VII of the α-series can then be carried through the same series of reactions to produce the compounds VIII, IX, X and I of the α-series.

The novel compounds disclosed herein are useful in the free base form or in the form of acid-addition or quaternary ammonium salts, said salts also being within the purview of the invention. The preferred type of salts are pharmacodynamically acceptable salts, that is, salts whose anions are relatively innocuous to an animal organism in pharmacodynamic doses of the salts, so that the beneficial physiological properties inherent in the free base are not vitiated by side-effects ascribable to the anions. Appropriate acid-addition salts are those derived from mineral acids such as hydrochloric acid, hydrobromic acid, hydriodic acid, nitric acid, sulfuric acid and phosphoric acid, and organic acids such as acetic acid, citric acid, lactic acid, and tartaric acid. The quaternary ammonium salts are obtained by the addition of esters having a molecular weight less than about 200 to the free base form of the compounds. A preferred class of esters comprises alkyl, alkenyl or aralkyl esters of inorganic acids or organic sulfonic acids, and include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by disolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl ester in an organic solvent. Heating can be used to facilitate the reaction, although salt formation usually takes place readily at room temperature. The quaternary ammonium salt separates directly or can be obtained by concentration of the solution.

Although pharmacodynamically acceptable salts are preferred, all acid-addition salts are within the scope of our invention. All acid-addition salts are useful as sources of the free base form even if the particular salt per se is not desired as the final product, as for example when the salt is formed for purposes of purification or identification, or when it is used as an intermediate in preparing a pharmacodynamically acceptable salt by ion exchange procedures. All crystalline salts are also useful as characterizing derivatives of the free bases.

The molecular structures of the novel compounds herein disclosed are established by their mode of synthesis and corroborated by the correspondence of calculated and found values for the elementary analyses for representative examples. The structures are further confirmed by ultraviolet and infrared spectral data proving the presence of the various functional groups.

The compounds of our invention having the general Formula I possess valuable pharmacodynamic properties, in particular, analgesic activity. For example, when tested intraperitoneally in rats by the Bass-Van der Brook modification of the D'Amour-Smith method, 3-phenyl-3-carbethoxytropane hydrochloride [I; R is $CH_3$, R' is H, R'' is $C_2H_5$, β-series], was found to be approximately two and one-quarter times as active as meperidine hydrochloride as an analgesic. The former compound has an intravenous toxicity ($LD_{50}$) in rats of $12.6 \pm 1.6$ mg./kg. of body weight, and is very well tolerated by adult rhesus monkeys when administered intramuscularly in doses of 12 and 18 mg./kg. No depression of the respiratory rate or convulsions were observed in monkeys following administration of 3-phenyl-3-carbethoxytropane hydrochloride at doses as high as 18 mg./kg., whereas meperidine hydrochloride caused slight to moderate respiratory depression of one to three hours duration in monkeys when administered intramuscularly in single, daily doses of 6.4 and 12.8 mg./kg.

The compounds of Formula I can be prepared for use by formulation in the same manner as meperidine, e.g., in aqueous or aqueous-ethanol menstruum, or in solid form, e.g., tablet or powder. The tablet formulation can be prepared using conventional excipients, and the powder can be compounded in capsule form. These preparations can be administered orally or, in the case of aqueous preparations, intramuscularly, intraperitoneally or intravenously.

The intermediates of Formulas VI–X and related compounds of Formula XI also possess pharmacological utility, for example anticholinergic or ganglionic blocking activity, and they can be prepared for use in the same manner as atropine or hexamethonium, e.g., as isotonic aqueous solutions for subcutaneous or intramuscular injection, or as tablets for oral administration.

The following examples will further illustrate the invention without being limited thereby.

EXAMPLE 1

*3-(Diphenylhydroxymethyl)Pseudotropine Hydrochloride*

[VI; R is $CH_3$, R' is H]

A solution of 100 g. of α-ecgonine methyl ester [V; R is $CH_3$] in 325 ml. of tetrahydrofuran was added during a period of twenty minutes to a stirred solution of phenyllithium (prepared from 316 g. of bromobenzene and 27.9 g. of lithium wire) in one liter of ether. Vigorous reflux accompanied the addition and stopped abruptly when the addition was complete. The reaction mixture was stirred and refluxed for one hour, then cooled and treated with 300 ml. of water. The solid material which precipitated was removed by filtration and washed with ether. The dark red filtrates were decolorized with activated charcoal, dried over anhydrous sodium sulfate, and the resulting solution was treated directly with an excess of alcoholic hydrogen chloride which caused separation of a nearly colorless crystalline powder. The latter was collected and dried at 60° C. in a vacuum oven for fifteen hours, giving 167 g. of 3-(diphenylhydroxymethyl)pseudotropine hydrochloride, M.P. 279.5–280.5° C. (decomposition)(corrected) after two recrystallizations from a methanol-ether mixture.

*Anal.*—Calcd. for $C_{21}H_{25}NO_2 \cdot HCl$: C, 70.08; H, 7.28; Cl, 9.85. Found: C, 69.99; H, 7.39; Cl, 9.74.

A sample of the hydrochloride was treated with aqueous sodium carbonate, and the resulting free base was collected and recrystallized three times from hexane, giving 3-(diphenylhydroxymethyl)pseudotropine, M.P. 116–117° C. (uncorr.).

*Anal.*—Calcd. for $C_{21}H_{25}NO_2$: C, 77.99; H, 7.79; N, 4.33. Found: C, 77.93; H, 7.85; N, 4.29.

EXAMPLE 2

*3-Benzhydrylidenetropane Epoxide*

[VII; R is $CH_3$, R' is H, β-series]

Fused, powered zinc chloride (10 g.) was added all at once to a stirred suspension of 10 g. of 3-(diphenylhydroxymethyl)pseudotropine hydrochloride (Example 1) in 25 ml. of acetic anhydride at room temperature. Within fifty minutes the reaction mixture became homogeneous. After stirring for eighty minutes the dark brown solution was poured into a solution of 25 g. of sodium hydroxide in 200 ml. of water. The tan colored solid which separated was collected, dried and extracted with 250 ml. of boiling hexane. Upon evaporation of the extract to a volume of 100 ml. and cooling there separated 4.7 g. of crystalline powder, M.P. 155–166° C. Concentration of the filtrate gave an additional 1.0 g., M.P. 150–161° C. The crops were combined and recrystallized from 30 ml. of boiling methanol to give 4.3 g. of 3-benzhydrylidenetropane epoxide in the form of colorless plates, M.P. 166–166.5° C. (uncorr.).

*Anal.*—Calcd. for $C_{21}H_{25}NO$: C, 82.55; H, 7.59; N, 4.59. Found: C, 82.32; H, 7.65; N, 4.04.

The hydrochloride salt of 3-benzhydrylidenetropane epoxide was prepared by addition of an excess of alcoholic hydrogen chloride to an ethereal solution of the free base. The hydrochloride salt had the M.P. 276–277° C. (dec.) (corr.) when recrystallized from a methanol-ether mixture.

*Anal.*—Calcd. for $C_{21}H_{23}NO \cdot HCl$: C, 73.77; H, 7.07; N, 4.10. Found: C, 73.48; H, 6.74; N, 4.04.

Neither 3-benzhydrylidenetropane epoxide in carbon tetrachloride solution or its hydrochloride in a potassium bromide pellet exhibited carbonyl or hydroxyl type absorption in the infrared specturm. The ultraviolet spectrum of the free base showed an extinction coefficient of 13,400 and a maximum at 220 m$\mu$ plus weak absorption peaks at 250–260 m$\mu$.

EXAMPLE 3

*3-Phenyl-3-Benzoyltropane*

[VIII; R is $CH_3$, R' is H, β-series]

(A) METHOD 1 [FROM 3-(DIPHENYLHYDROXYMETHYL)PSEUDOTROPINE]

Fused, powdered zinc chloride (98 g.) was added all at once to a stirred suspension of 98 g. of 3-(diphenylhydroxymethyl)pseudotropine hydrochloride (Example 1) in 250 ml. of acetic anhydride. The reaction vessel was cooled in an ice-water bath since the initial reaction was mildly exothermic. After stirring for one hour, the clear, dark brown solution was left at room temperature for sixty-three hours and then poured into a solution of 250 g. of sodium hydroxide in two liters of water with cooling. The solid material which separated was collected and extracted once with one liter of methylene dichloride. The filtrate was extracted three times with 200 ml. portions of methylene dichloride. The methylene dichloride extracts were dried and concentrated, and the residual oil crystallized from 600 ml. of hexane. The 48.5 g. of 3-phenyl-3-benzoyltropane thus obtained had the M.P. 121–122.5° C. (uncorr.) when recrystallized from 700 ml. of hexane.

Anal.—Calcd. for $C_{21}H_{23}NO$: C, 82.55; H, 7.59; N, 4.59. Found: C, 82.87; H, 7.43; N, 4.57.

The hydrochloride salt of 3-phenyl-3-benzoyltropane was obtained by treating an ether solution of a sample of the free base with an excess of alcoholic hydrogen chloride. The hydrochloride had the M.P. 249–251° C. (corr.) when recrystallized from absolute ethanol.

Anal.—Calcd. for $C_{21}H_{23}NO \cdot HCl$: C, 73.77; H, 7.07; Cl, 10.37. Found: C, 73.50; H, 6.98; Cl, 10.13.

The methiodide salt of 3-phenyl-3-benzoyltropane was prepared by treating an acetone solution of the free base with an excess of methyl iodide. The methiodide salt separated directly from solution and had the M.P. 233.5–237.5° C. (corr.).

Anal.—Calcd. for $C_{22}H_{26}INO$: C, 59.06; H, 5.87; I, 28.37. Found: C, 59.17; H, 5.60; I, 28.19.

The methiodide salt of 3-phenyl-3-benzoyltropane was found to have an anticholinergic activity 6.8% that of atropine sulfate. Its intravenous toxicity in mice ($ALD_{50}$) was 9 mg./kg. of body weight.

(B) METHOD 2 [FROM 3-BENZHYDRYLIDENE-TROPANE EPOXIDE]

A mixture of 3-benzhydrylidenetropane epoxide hydrochloride (Example 2, prepared from 2.0 g. of the free base), 2 g. of fused, powdered zinc chloride and 5 ml. of acetic anhydride was stirred at room temperature for fifty-four hours. The reaction mixture was worked up according to the procedure described above in Method 1, giving 1.1 g. of 3-phenyl-3-benzoyltropane which upon recrystallization from hexane melted at 121.5–122° C., undepressed upon admixture with the product obtained above by Method 1.

EXAMPLE 4

*3-Phenyl-3-(Phenylisonitrosomethyl)Tropane Hydrochloride*

[IX; R is $CH_3$, R' is H, β-series]

A mixture of 10 g. of 3-phenyl-3-benzoyltropane (Example 3) and 10 g. of hydroxylamine hydrochloride in 25 ml. of pyridine and 75 ml. of absolute alcohol was refluxed for fifteen hours. During this time the very insoluble oxime hydrochloride separated directly from the reaction mixture. The reaction mixture was cooled and the solid product collected by filtration, washed with ethanol and water and dried, giving 11.0 g. of 3-phenyl-3-(phenylisonitrosomethyl)tropane hydrochloride, M.P. 327° C. (dec.) (uncorr.).

Anal.—Calcd. for $C_{21}H_{24}N_2O \cdot HCl$: C, 70.67; H, 7.06; N, 7.85. Found: C, 70.52; H, 6.86; N, 7.72.

EXAMPLE 5

*3-Phenyl-3-Carboxytropane Hydrochloride*

[X; R is $CH_3$, R' is H, β-series]

A suspension of 10 g. of 3-phenyl-3-(phenylisonitrosomethyl)tropane hydrochloride (Example 4) in 75 ml. of acetic acid at 0° C. was saturated with dry hydrogen chloride gas. The solution was enclosed in a pressure bottle and heated on a steam bath for seventy minutes. At the end of this period the bottle was cooled, opened, and the solvent was evaporated in vacuo on a steam bath. The residue was dissolved in 50 ml. of warm methanol, and 200 ml. of ether was added to cause separation of a solid product. The latter was collected and recrystallized from 75 ml. of methanol and 130 ml. of ether, giving 4.5 g. of 3-phenyl-3-carboxytropane hydrochloride, M.P. 224–225° C. (dec.) (corr.) after a second recrystallization from the same solvents.

Anal.—Calcd. for $C_{15}H_{19}NO_2 \cdot HCl$: C, 63.93; H, 7.16; Cl, 12.58. Found: C, 63.80; H, 7.30; Cl, 12.55.

It was found that in the preceding preparation the pressure bottle could be dispensed with and the reaction accomplished by heating the reaction mixture at 100° C. for two hours at atmospheric pressure while passing in dry hydrogen chloride.

In another run, aniline was isolated from the mother liquors by steam distillation, thus proving that the starting oxime had undergone a Beckmann rearrangement, followed by cleavage of the intermediate amide.

EXAMPLE 6

*3-Phenyl-3-Carbethoxytropane Hydrochloride*

[I; R is $CH_3$, R' is H, R'' is $C_2H_5$, β-series]

A solution of 1.0 g. of 3-phenyl-3-carboxytropane hydrochloride (Example 5) in 40 ml. of absolute ethanol was saturated with dry hydrogen chloride and allowed to stand at room temperature for six days. The reaction mixture was then concentrated in vacuo, and the solid residue was recrystallized from 15 ml. of absolute ethanol and 125 ml. of anhydrous ether, giving 0.9 g. of 3-phenyl-3-carbethoxytropane hydrochloride in the form of colorless needles, M.P. 187–191° C. (dec.) (corr.).

Anal.—Calcd. for $C_{17}H_{23}NO_2 \cdot HCl$: C, 65.90; H, 7.81; Cl, 11.49. Found: C, 65.82; H, 7.81; Cl, 11.28.

By replacement of the ethanol in the preceding preparation by methanol, 1-propanol, 2-propanol, 1-butanol or 1-hexanol, there can be obtained, respectively, 3-phenyl-3-carbomethoxytropane hydrochloride [I; R is $CH_3$, R' is H, R'' is $CH_3$]; 3-phenyl-3-carbopropoxytropane hydrochloride [I; R is $CH_3$, R' is H, R'' is $(CH_2)_2CH_3$]; 3-phenyl-3-carboisopropoxytropane hydrochloride [I; R is $CH_3$, R' is H, R'' is $CH(CH_3)_2$]; 3-phenyl-3-carbobutoxytropane hydrochloride [I; R is $CH_3$, R' is H, R'' is $(CH_2)_3CH_3$]; or 3-phenyl-3-carbohexoxytropane hydrochloride [I; R is $CH_3$, R' is H, R'' is $(CH_2)_5CH_3$].

The methobromide salt of 3-phenyl-3-carbethoxytropane was prepared by treating an acetonitrile solution of the free base with an excess of methyl bromide. The product separated directly from the solution and had the M.P. 206–207.5° C. (uncorr.) after recrystallization from an isopropyl alcohol-ether mixture.

Anal.—Calcd. for $C_{18}H_{26}NO_2Br$: C, 58.19; H, 7.12; Br, 21.70. Found: C, 58.44; H, 7.13; Br, 21.63.

3-phenyl-3-carbethoxytropane hydrochloride can be reacted with a molar equivalent amount of a base, e.g., sodium hydroxide, to give the free base, 3-phenyl-3-carbethoxytropane, which in turn can be reacted with hydrobromic acid, hydriodic acid, sulfuric acid, phosphoric acid, lactic acid, quinic acid, methanesulfonic acid, methyl iodide, allyl bromide, benzyl bromide, or o-chlorobenzyl chloride to give, respectively, the hydrobromide, hydriodide, sulfate (or bisulfate), phosphate (or acid phosphate), lactate, quinate, methanesulfonate, methiodide, allobromide, benzobromide, or o-chlorobenzochloride salts.

EXAMPLE 7

*3-Benzhydrylidenetropane Epoxide Hydrochloride*

[VII; R is $CH_3$, R' is H, α-series]

A mixture of 36.3 g. of 3-diphenylhydroxymethyl-pseudotropine hydrochloride and 500 ml. of acetic anhydride was refluxed for twenty hours, then cooled to room temperature and diluted with 1200 ml. of ether, whereupon there separated 20 g. of tan crystalline solid. Recrystallization of the latter material from 40 ml. of absolute methanol and 350 ml. of ether gave 3-benzhydrylidenetropane epoxide hydrochloride, M.P. 265–266° C. (dec.) (corr.).

Anal.—Calcd. for $C_{21}H_{23}NO \cdot HCl$: C, 73.77; H, 7.07; Cl, 10.37. Found: C, 73.63; H, 7.19; Cl, 10.40.

The free base, 3-benzhydrylidenetropane epoxide, obtained by treating the hydrochloride with aqueous sodium hydroxide, melted at 162–164.5° C. (uncorr.) after recrystallization from hexane.

Anal.—Calcd. for $C_{21}H_{23}NO$: C, 82.55; H, 7.59. Found: C, 82.10; H, 7.71.

A mixed melting point and comparisons of the infrared spectra of the 3-benzhydrylidenetropane epoxide (α-series) just described and the 3-benzhydrylidenetropane epoxide of the β-series described above in Example 2 indicated that the two compounds were different. The infrared spectrum exhibited no absorption characteristic of a carbonyl or hydroxyl group. The ultraviolet spectrum had a maximum at 219 mμ with an extinction coefficient of 12,700 plus weak absorption at 250–260 mμ.

EXAMPLE 8

*3-Phenyl-3-Benzoyltropane*

[VIII; R is $CH_3$, R' is H, α-series]

A stirred mixture of 2.0 g. of 3-benzhydrylidenetropane epoxide hydrochloride (α-series, Example 7), 2.0 g. of fused, powdered zinc chloride and 11 ml. of acetic anhydride was heated on a steam bath for one and one-half hours, then cooled and poured into excess aqueous sodium hydroxide. The product was extracted with methylene dichloride and the extracts were decolorized with activated charcoal, dried and concentrated. The residual oil was boiled with 100 ml. of hexane, filtered, and the filtrate cooled to give additional solid which was removed by filtration. The second filtrate was concentrated, and the residue was dissolved in ether and treated with an excess of alcoholic hydrogen chloride. A gum separated which upon warming with acetone formed a crystalline solid. The latter was recrystallized from a methanol-ether mixture to give 3-phenyl-3-benzoyltropane in the form of colorless needles, M.P. 312° C. (dec.) (uncorr.).

Anal.—Calcd. for $C_{21}H_{23}NO \cdot HCl$: C, 73.77; H, 7.07; Cl, 10.37. Found: C, 73.90; H, 7.04; Cl, 10.11.

The ultraviolet spectrum of 3-phenyl-3-benzoyltropane (α-series) showed extinction coefficients of 10,300 and 336 and maxima at 249 and 320 mμ, respectively. The infrared spectrum exhibited a strong band at 6.00μ.

EXAMPLE 9

3-phenyl-3-(phenylisonitrosomethyl)tropane [IX; R is $CH_3$, R' is H, α-series] can be prepared from 3-phenyl-3-benzoyltropane (α-series) (Example 8) and hydroxylamine hydrochloride according to the manipulative procedure described above in Example 4.

EXAMPLE 10

3-phenyl-3-carboxytropane [X; R is $CH_3$, R' is H, α-series] can be prepared from 3-phenyl-3-(phenylisonitrosomethyl)tropane (α-series) and acetic acid saturated with hydrogen chloride according to the manipulative procedure described above in Example 5.

EXAMPLE 11

3-phenyl-3-carbethoxytropane [I; R is $CH_3$, R' is H, R" is $C_2H_5$, α-series] can be prepared from 3-phenyl-3-carboxytropane (α-series) and hydrogen chloride in ethanol according to the manipulative procedure described above in Example 6.

EXAMPLE 12

*3-[Di(m-Anisyl)Hydroxymethyl]Pseudotropine*

[VI; R is $CH_3$, R' is $OCH_3$]

A solution of 40 g. of α-ecgonine methyl ester in 500 ml. of tetrahydrofuran was added to a stirred solution of m-anisyl-magnesium bromide (prepared from 187 g. of m-anisyl bromide and 25 g. of magnesium) in 900 ml. of ether over a period of fifteen minutes. The reaction mixture was stirred and refluxed overnight. The reaction mixture was worked up according to the procedure described above in Example 1, giving 54.7 g. of 3-[di(m-anisyl)hydroxymethyl]pseudotropine as the hydrochloride salt. The latter had the melting point 236–237° C. (dec.) (uncorr.) when recrystallized from isopropyl alcohol and an isopropyl alcohol-ether mixture.

Anal.—Calcd. for $C_{23}H_{29}NO_4 \cdot HCl$: C, 65.78; H, 7.20; Cl, 8.44. Found: C, 65.84; H, 6.86; Cl, 8.55.

EXAMPLE 13

*3-(m-Anisyl)-3-(m-Anisoyl)Tropane*

[VIII; R is $CH_3$, R' is $OCH_3$]

A stirred, cooled suspension of 54.7 g. of 3-[(m-anisyl)hydroxymethyl]pseudotropine hydrochloride in 150 ml. of acetic anhydride was treated all at once with 150 g. of fused, powdered zinc chloride, and the mixture was stirred at room temperature for fifteen hours. Following a procedure the same as that described above in Example 3, part A, there was obtained 44 g. of 3-(m-anisyl)-3-(m-anisoyl)tropane in the form of a brown oil. The infrared spectrum of this compound in chloroform solution exhibited a strong peak at 6.02μ characteristic of an aromatic ketone. This product was used in the next reaction without further purification.

EXAMPLE 14

*3-(m-Anisyl)-3-[(m-Anisyl)Isonitrosomethyl]Tropane Hydrochloride*

[IX; R is $CH_3$, R' is $OCH_3$]

A mixture of 44 g. of 3-(m-anisyl)-3-(m-anisoyl)tropane (Example 13), 44 g. of hydroxylamine hydrochloride, 130 ml. of pyridine and 400 ml. of absolute alcohol was refluxed for nineteen hours. Upon cooling to 0° C. there separated a solid product which was collected by filtration, washed with 200 ml. of absolute ethanol, and dried, giving 22.5 g. of 3-(m-anisyl)-3-[(m-anisyl)isonitrosomethyl]tropane hydrochloride, which upon recrystallization from water had the M.P. about 295° C. (dec.) (uncorr.).

Anal.—Calcd. for $C_{23}H_{28}N_2O_3 \cdot HCl$: N, 6.72. Found: N, 6.71.

EXAMPLE 15

*3-(m-Anisyl)-3-Carboxytropane Hydrochloride*

[X; R is $CH_3$, R' is $OCH_3$]

A suspension of 5.0 g. of 3-(m-anisyl)-3-[(m-anisyl)-isonitrosomethyl]tropane hydrochloride (Example 14) in 250 ml. of acetic acid was heated on a steam bath for two hours while a slow stream of dry hydrogen chloride was passed into the reaction mixture. The reaction mixture was then evaporated to dryness, the residue dissolved in 90 ml. of n-propyl alcohol, and the solution was filtered and treated with 9 ml. of triethylamine and 150 ml. of acetone. After standing overnight at room temperature there had formed 2.4 g. of crystalline 3-(m-anisyl)-3-carboxytropane, M.P. 235° C. (dec.) (uncorr.). The latter material was converted to its hydrochloride salt in n-propyl alcohol solution. The resulting 3-(m-anisyl)-3-carboxytropane hydrochloride had the M.P. 215–217.5° C. (uncorr.) when recrystallized from an n-propyl alcohol-ether mixture.

Anal.—Calcd. for $C_{12}H_{21}NO_3 \cdot HCl$: Cl, 11.37. Found: Cl, 11.14.

3-(m-anisyl)-3-carboxytropane can be converted to 3-(m-hydroxyphenyl)-3-carboxytropane [X; R is $CH_3$, R' is OH] by refluxing it with aqueous hydrogen bromide and neutralizing the excess acid, according to the manipulative procedure given below in Example 90.

EXAMPLE 16

*3-(m-Anisyl)-3-Carbethoxytropane Hydrobromide*

[I; R is $CH_3$, R' is $OCH_3$, R" is $C_2H_5$]

A solution of 0.18 g. of 3-(m-anisyl)-3-carboxytropane in absolute ethanol was refluxed in a slow stream of dry hydrogen chloride for fifteen hours. After removal of the solvent under vacuum, the residue was dissolved in water, the solution made basic with dilute sodium hydroxide and the product extracted with methylene dichloride. The extracts were dried and concentrated giving 3-(m-anisyl)-3-carbethoxytropane in the form of an oil which was converted to its hydrobromide salt and crystallized from an ethanol-ether mixture giving 3-(m-anisyl)-3-carbethoxytropane hydrobromide, M.P. 178–180° C. (uncorr.).

*Anal.*—Calcd. for $C_{18}H_{25}NO_2 \cdot HBr$: C, 56.25; H, 6.82. Found: C, 55.66; H, 6.64.

By replacement of the (3-m-anisyl)-3-carboxytropane in the preceding preparation by a molar equivalent amount of 3-(m-hydroxyphenyl)-3-carboxytropane, there can be obtained 3-(m-hydroxyphenyl)-3-carbethoxytropane [I; R is $CH_3$, R' is OH, R" is $C_2H_5$]. The latter compound can be reacted with acetic anhydride, caproyl chloride, succinic anhydride, β-cyclopentylpropionyl chloride, benzyl chloride, 3,4,5-trimethoxybenzoyl chloride or phenylacetyl chloride, to give, respectively, 3-(m-acetoxyphenyl)-3-carbethoxytropane, 3-(m-caproyloxyphenyl)-3-carbethoxytropane, 3-[m-(β-carboxypropionyloxy)phenyl]-3-carbethoxytropane, 3-[m-(β-cyclopentylpropionyloxy)-phenyl]-3-carbethoxytropane, 3-(m-benzoyloxyphenyl)-3-carbethoxytropane, 3-[m-(3,4,5-trimethoxybenzoyloxy)-phenyl]-3-carbethoxytropane, or 3-(m-phenylacetoxyphenyl)-3-carbethoxytropane.

EXAMPLE 17

3-(m-hydroxyphenyl)-3-(m-hydroxybenzoyl)tropane [VIII; R is $CH_3$, R' is OH] can be prepared by refluxing 3-(m-anisyl)-3-(m-anisoyl)tropane (Example 13) with aqueous hydrogen bromide and neutralizing the excess acid, according to the manipulative procedure given below in Example 90.

EXAMPLE 18

3-(m-hydroxyphenyl)-3-[(m-hydroxyphenyl)isonitrosomethyl]tropane [IX; R is $CH_3$, R' is OH] can be prepared from 3-(m-hydroxyphenyl)-3-(m-hydroxybenzoyl)tropane and hydroxylamine hydrochloride in pyridine-alcohol solution according to the manipulative procedure described above in Example 14.

EXAMPLE 19

3-(m-hydroxyphenyl)-3-carboxytropane [X; R is $CH_3$, R' is OH] can be prepared from 3-(m-hydroxyphenyl)-3-[(m-hydroxyphenyl)isonitrosomethyl]tropane and acetic acid saturated with hydrogen chloride according to the manipulative procedure described above in Example 15.

EXAMPLE 20

3-(m-hydroxyphenyl)-3-carbethoxytropane [I; R is $CH_3$, R' is OH, R" is $C_2H_5$] can be prepared from 3-(m-hydroxyphenyl)-3-carboxytropane in absolute ethanol saturated with hydrogen chloride according to the manipulative procedure described above in Example 16.

EXAMPLE 21

(a) *Nor-α-Ecgonine Methyl Ester*

[V; R is H]

A saturated, aqueous solution of 243 g. of nortropinone hydrochloride was added rapidly with stirring to a cold, saturated, aqueous solution of 107 g. of potassium cyanide while maintaining the temperature below 25° C. The thick, white slurry of cyanohydrin [III; R is H] was stirred for one hour at room temperature, collected by filtration, pressed as dry as possible and then added immediately to two liters of concentrated hydrochloric acid with stirring and cooling to keep the temperature below 25° C. The reaction mixture was stirred at room temperature for fifteen hours and then concentrated under vacuum. The residue was dried by adding benzene and distilling off the benzene, and finally by heating the residue at 100° C. and 3 mm. pressure. Esterification of the resulting 3-hydroxy-3-carboxynortropane [IV; R is H] was accomplished by refluxing it with 2.5 liters of methanol for twenty hours, during the first five hours of which period a rapid stream of dry hydrogen chloride was passed into the boiling solution. The reaction mixture was evaporated under vacuum, the solid residue dissolved in 550 ml. of water, the solution filtered and the filtrate treated with 400 g. of solid potassium carbonate with cooling. The solid material which separated was extracted twice with a total volume of 1.5 liters of boiling chloroform. The extracts were dried and concentrated, giving 135 g. of nor-α-ecgonine methyl ester, M.P. 142–146° C. (uncorr.). Additional ester was isolated by further addition of potassium carbonate to the aqueous phase; 28 g., M.P. 137–144° C. (uncorr.). A sample when recrystallized from ethyl acetate had the M.P. 144–147° C. (corr.).

*Anal.*—Calcd. for $C_9H_{15}NO_3$: C, 58.36; H, 8.16; N, 7.56. Found: C, 58.28; H, 8.14; N, 7.60.

(b) *3-(Diphenylhydroxymethyl)Norpseudotropine Hydrochloride*

[VI; R and R' are H]

A solution of 100 g. of nor-α-ecgonine methyl ester, prepared as described in Part a above, in 1.5 liters of tetrahydrofuran was added to a stirred solution of phenyllithium (prepared from 594 g. of bromobenzene and 52.5 g. of lithium wire) in 1.5 liters of ether under a nitrogen atmosphere during a period of thirty minutes. The mixture was stirred and refluxed for three hours and then stirred at room temperature overnight. Following the same work-up procedure as that described in Example 1 there was obtained 157 g. of 3-(diphenylhydroxymethyl)-norpseudotropine hydrochloride, which upon recrystallization from n-propyl alcohol had the M.P. 259.5° C. (dec.) (corr.). The product was found to contain n-propyl alcohol of crystallization.

*Anal.*—Calcd. for $C_{20}H_{23}NO_2 \cdot HCl \cdot \frac{1}{3}C_3H_8O$: C, 68.93; H, 7.34; Cl, 9.69; $C_3H_7O$, 5.38. Found: C, 69.24, 68.93; H, 7.84, 7.53; Cl, 9.69; $C_3H_7O$, 5.38.

EXAMPLE 22

*3-Phenyl-3-Benzoylnortropane*

[VIII; R and R' are H]

A stirred suspension of 10 g. of 3-(diphenylhydroxymethyl)norpseudotropine hydrochloride (Example 21) in 30 ml. of acetic anhydride was treated all at once with 20 g. of fused, powdered zinc chloride. The temperature of the reaction mixture was kept at 15° C. for a few minutes and then stirred at room temperature for fifteen hours. The dark brown solution was then poured into 200 ml. of water, a few ml. of concentrated hydrochloric acid was added and the solution warmed on a steam bath until the odor of acetic anhydride was no longer detectable. The latter solution was made strongly acid with concentrated hydrochloric acid and the insoluble material which separated was extracted with methylene dichloride. The extracts were washed with sodium carbonate solution, dried and concentrated. The residue was recrystallized from 125 ml. of n-propyl alcohol, giving 4.2 g. of 3-phenyl-3-benzoylnortropane, M.P. 209–212° C. (uncorr.).

*Anal.*—Calcd. for $C_{20}H_{21}NO$: C, 82.43; H, 7.27; N, 4.81. Found: C, 82.56, 82.70; H, 6.94, 7.33; N, 4.78.

The hydrochloride salt of 3-phenyl-3-benzoylnortropane had the M.P. 290–291.5° C. (dec.) (corr.) when recrystallized from an n-propyl alcohol-ether mixture.

*Anal.*—Calcd. for $C_{20}H_{21}NO \cdot HCl$: C, 73.27; H, 6.77; Cl, 10.82. Found: C, 73.38; H, 6.66; Cl, 10.84.

EXAMPLE 23

(a) 8-Cyano-3-Phenyl-3-Benzoylnortropane

[VIII; R is CN, R' is H]

To a stirred solution of 7.1 g. of cyanogen bromide in 100 ml. of benzene at 50–55° C. was added over a period of three hours a solution of 10.0 g. of 3-phenyl-3-benzoyltropane in 250 ml. of benzene. The reaction mixture was stirred at 50–55° C. for two hours longer and allowed to stand overnight at room temperature. The reaction mixture was filtered to remove a small amount of crystalline material and the filtrate was evaporated to dryness under vacuum. The residue was recrystallized from 100 ml. of methanol giving 5.7 g. of 8-cyano-3-phenyl-3-benzoylnortropane, M.P. 160.5–162.5° C. (corr.) when recrystallized again from methanol.

Anal.—Calcd. for $C_{21}H_{20}N_2O$: C, 79.71; H, 6.37; N, 8.86. Found: C, 79.66; H, 6.33; N, 8.67.

(b) 3-Phenyl-3-Benzoylnortropane

[VIII; R and R' are H]

A mixture of 1.0 g. of 8-cyano-3-phenyl-3-benzoylnortropane, obtained as described in Part a above, and 50 ml. of concentrated hydrochloric acid was refluxed for seven hours. The reaction mixture was concentrated to approximately two-thirds the original volume under vacuum and made basic by treatment with excess solid potassium carbonate. The oily product which separated was extracted with methylene dichloride, and the extracts dried and concentrated. The residue was recrystallized from acetone and then twice from absolute alcohol, giving 3-phenyl-3-benzoylnortropane, M.P. 208–212° C., identical by mixed melting point and infrared comparison with the product obtained above in Example 22.

EXAMPLE 24

3-Phenyl-3-(Phenylisonitrosomethyl)Nortropane Hydrochloride

[IX; R and R' are H]

A mixture of 10.0 g. of 3-phenyl-3-benzoylnortropane (Examples 22, 23), 10.0 g. of hydroxylamine hydrochloride, 35 ml. of pyridine and 250 ml. of n-propyl alcohol was refluxed for sixteen hours. The reaction mixture was concentrated under vacuum and the residue crystallized from 25 ml. of water to give 10.5 g. of 3-phenyl-3-(phenylisonitrosomethyl)nortropane hydrochloride, M.P. 286° C. (dec.) (uncorr.) when recrystallized from water.

Anal.—Calcd. for $C_{20}H_{22}N_2O.HCl$: C, 70.06; H, 6.76; N, 8.17. Found: C, 69.95; H, 7.34; N, 7.94.

EXAMPLE 25

3-Phenyl-3-Carboxynortropane Hydrochloride

[X; R and R' are H]

A suspension of 3.0 g. of 3-phenyl-3-(phenylisonitrosomethyl)nortropane hydrochloride (Example 24) in 50 ml. of acetic acid was heated on a steam bath for five hours, and a slow stream of dry hydrogen chloride was passed into the reaction mixture during this period. The preparation was worked up according to the manipulative procedure described above in Example 5, giving 1.5 g. of 3-phenyl-3-carboxynortropane hydrochloride, M.P. 275–276.5° C. (dec.) (corr.) when recrystallized from a methanol-ether mixture.

Anal.—Calcd. for $C_{14}H_{17}NO_2.HCl$: C, 62.80; H, 6.78; Cl, 13.24. Found: C, 62.81; H, 6.88; Cl, 13.18.

EXAMPLE 26

3-Phenyl-3-Carbethoxynortropane Hydrochloride

[I; R and R' are H, R'' is $C_2H_5$]

A suspension of 6.0 g. of 3-phenyl-3-carboxynortropane hydrochloride (Example 25) in 300 ml. of thionyl chloride was refluxed for seventy-five minutes. The reaction mixture was concentrated in vacuo on a water bath, care being taken that the temperature did not rise above about 30° C. The residue was warmed with a small amount of absolute ethanol and then ether was added to cause separation of 5.8 g. of 3-phenyl-3-carbethoxynortropane hydrochloride, M.P. 219.5–221.5° C. (dec.) (corr.) when recrystallized from an ethanol-ether mixture.

Anal.—Calcd. for $C_{16}H_{21}NO_2.HCl$: C, 64.96; H, 7.50; Cl, 11.99. Found: C, 64.85; H, 7.15; Cl, 12.07.

Alternatively, the esterification was carried out by treatment of the 3-phenyl-3-carboxynortropane with alcoholic hydrogen chloride at room temperature for several days.

EXAMPLE 27

8-Allyl-3-Phenyl-3-Carbethoxynortropane Hydrochloride

[I; R is $CH_2=CHCH_2$, R' is H, R'' is $C_2H_5$]

A mixture of 4.6 g. of 3-phenyl-3-carbethoxynortropane hydrochloride (Example 26), 1.86 g. of allyl bromide, 6.6 g. of sodium carbonate and 100 ml. of n-butyl alcohol was refluxed for seventeen hours. The reaction mixture was concentrated to dryness under vacuum, the residue shaken with water and methylene dichloride, and the aqueous phase extracted twice with methylene dichloride. The combined methylene dichloride extracts were dried and concentrated to give an oily residue which was converted to its hydrochloride salt, giving 4.5 g. of 8-allyl-3-phenyl-3-carbethoxynortropane hydrochloride, M.P. 193.5–194° C. (dec.) (corr.) when recrystallized from an isopropyl alcohol-ether mixture.

Anal.—Calcd. for $C_{19}H_{25}NO_2.HCl$: C, 67.94; H, 7.80; Cl, 10.56. Found: C, 67.77; H, 7.79; Cl, 10.34.

EXAMPLE 28

8-propargyl-3-phenyl-3-carbethoxynortropane [I; R' is $CH \equiv CCH_2$, R' is H, R'' is $C_2H_5$] can be prepared by replacement of the allyl bromide in Example 27 by a molar equivalent amount of propargyl bromide.

EXAMPLE 29

8 - [2 - (p-aminophenyl)ethyl]-3-phenyl-3-carbethoxynortropane [I; R is $p-H_2NC_6H_4CH_2CH_2$, R' is H, R'' is $C_2H_5$] can be prepared by replacement of the allyl bromide in Example 27 by a molar equivalent amount of 2-(p-aminophenyl)ethyl chloride.

EXAMPLE 30

8 - benzyl-3-phenyl-3-carbethoxynortropane [I; R is $C_6H_5CH_2$, R' is H, R'' is $C_2H_5$] can be prepared by replacement of the allyl bromide in Example 27 by a molar equivalent amount of benzyl bromide.

EXAMPLE 31

8 - (3-phenylpropyl)-3-phenyl-3-carbethoxynortropane [I; R is $C_6H_5CH_2CH_2CH_2$, R' is H, R'' is $C_2H_5$] can be prepared by replacement of the allyl bromide in Example 27 by a molar equivalent amount of 3-phenylpropyl chloride.

EXAMPLE 32

8 - [2-(p-methoxyphenyl)ethyl]-3-phenyl-3-carbethoxynortropane [I; R is $p-CH_3OC_6H_4CH_2CH_2$, R' is H, R'' is $C_2H_5$] can be prepared by replacement of the allyl bromide in Example 27 by a molar equivalent amount of 2-(p-methoxyphenyl)ethyl chloride.

EXAMPLE 33

8 - [2 - (p-chlorophenyl)ethyl]-3-phenyl-3-carbethoxynortropane [I; R is $p-ClC_6H_4CH_2CH_2$, R' is H, R'' is $C_2H_5$] can be prepared by replacement of the allyl bromide in Example 27 by a molar equivalent amount of 2-(p-chlorophenyl)ethyl chloride.

EXAMPLE 34

8-cyclopropyl-3-phenyl-3-carbethoxynortropane [I; R is $C_3H_5$, R' is H, R" is $C_2H_5$] can be prepared by replacement of the allyl bromide in Example 27 by a molar equivalent amount of cyclopropyl bromide.

EXAMPLE 35

8 - cyclopropylmethyl-3-phenyl-3-carbethoxynortropane [I; R is $C_3H_5CH_2$, R' is H, R" is $C_2H_5$] can be prepared by replacement of the allyl bromide in Example 27 by a molar equivalent amount of cyclopropylmethyl bromide.

EXAMPLE 36

8-ethyl-3-phenyl-3-carbethoxynortropane [I; R is $C_2H_5$, R' is H, R" is $C_2H_5$] can be prepared by replacement of the allyl bromide in Example 27 by a molar equivalent amount of ethyl bromide.

EXAMPLE 37

8-(3,3-diphenyl-3-cyanopropyl)-3-phenyl-3-carbethoxynortropane [I; R is $(C_6H_5)_2C(CN)CH_2CH_2$, R' is H, R" is $C_2H_5$] can be prepared by replacement of the allyl bromide in Example 27 by a molar equivalent amount of 3,3-diphenyl-3-cyanopropyl bromide.

EXAMPLE 38

*8-Cinnamyl-3-Carbethoxy-3-Phenylnortropane Methanesulfonate*

[I; R is $C_6H_5CH=CHCH_2$, R' is H, R" is $C_2H_5$]

A mixture of 5.8 g. of 3-phenyl-3-carbethoxynortropane hydrochloride (Example 26), 3.8 g. of cinnamyl bromide, 7.2 g. of sodium carbonate and 200 ml. of n-butyl alcohol was refluxed for sixteen hours. Following the manipulative procedure described above in Example 27, the product was obtained in the free base form as an oil. The latter was taken up in ether and treated with a slight excess of methanesulfonic acid which was crystallized from acetone and then twice from an isopropyl alcohol-ether mixture to give 8-cinnamyl-3-carbethoxy-3-phenylnortropane methanesulfonate in the form of colorless needles, M.P. 178–180.5° C. (corr.).

*Anal.*—Calcd. for $C_{25}H_{29}NO_2 \cdot CH_3SO_3H$: C, 66.21; H, 7.05; S, 6.80. Found: C, 66.26; H, 7.33; S, 6.78.

EXAMPLE 39

*8-(2-Phenylaminoethyl)-3-Phenyl-3-Carbethoxynortropane p-Toluenesulfonate*

[I; R is $C_6H_5NHCH_2CH_2$, R' is H, R" is $C_2H_5$]

A mixture of 4.3 g. of 3-phenyl-3-carbethoxynortropane hydrochloride (Example 26), 4.0 g. of 2-phenylaminoethyl bromide hydrobromide, 6.0 g. of sodium carbonate and 100 ml. of n-butyl alcohol was refluxed for fifteen hours. Following the manipulative procedure described above in Example 27, the product was obtained in the free base form as an oil. An acetone solution of the latter was treated with a slight excess of p-toluenesulfonic acid in alcohol. Addition of ether gave a gum which was crystallized from acetone and then recrystallized twice from n-propyl alcohol, giving 8-(2-phenylaminoethyl) - 3 - phenyl - 3 - carbethoxynortropane p-toluenesulfonate in the form of colorless blades, M.P. 194–195° C. (uncorr.).

*Anal.*—Calcd. for $C_{24}H_{30}N_2O_2 \cdot C_7H_8SO_3$: N, 5.09. Found: N, 4.94.

EXAMPLE 40

*8-(n-Octyl)-3-Phenyl-3-Carbethoxynortropane Hydrochloride*

[I; R is n-$C_8H_{17}$, R' is H, R" is $C_2H_5$]

A mixture of 5.0 g. of 3-phenyl-3-carbethoxynortropane hydrochloride (Example 26), 3.4 g. of n-octyl bromide, 3 g. of sodium carbonate and 50 ml, of n-butyl alcohol was refluxed for fifteen hours. The reaction mixture was worked up by the manipulative procedure described above in Example 27 and the product isolated in the form of the hydrochloride salt, giving 4 g. of 8-(n - octyl) - 3 - phenyl - 3 - carbethoxynortropane hydrochloride, M.P. 138.8–146.0° C. (corr.) when recrystallized from a carbon tetrachloride-ether mixture.

*Anal.*—Calcd. for $C_{24}H_{37}NO_2 \cdot HCl$: C, 70.65; H, 9.39; Cl, 8.69. Found: C, 70.74; H, 9.11; Cl, 8.57.

EXAMPLE 41

8 - (n - amyl) - 3 - phenyl - 3 - carbethoxynortropane hydrochloride [I; R is n-$C_5H_{11}$, R' is H, R" is $C_2H_5$] was prepared from 3.0 g. of 3-phenyl-3-carbethoxynortropane hydrochloride, 1.6 g. of n-amyl bromide, 2 g. of sodium carbonate and 50 ml. of n-butyl alcohol according to the manipulative procedure described above in Example 27. There was thus obtained 2.6 g. of 8-(n-amyl)-3-phenyl-3-carbethoxynortropane hydrochloride, M.P. 148.6–155.4° C. (corr.) when recrystallized from carbon tetrachloride.

*Anal.*—Calcd. for $C_{21}H_{31}NO_2 \cdot HCl$: C, 68.92; H, 8.82; Cl, 9.69. Found: C, 68.67; H, 8.72; Cl, 9.44.

EXAMPLE 42

*8-(2-Phenylethyl)Nor-α-Ecgonine Methyl Ester Hydrochloride*

[V; R is $C_6H_5CH_2CH_2$, lower-alkyl is $CH_3$]

A solution of 1.7 g. of nor-α-ecgonine methyl ester (Example 21), 1.9 g. of 2-phenylethyl bromide and 2.0 g. of potassium acetate was refluxed for four and one-half hours. The solvent was evaporated under vacuum and the residue heated at 100° C. and 0.3 mm. to remove last traces of solvent. The residue was stirred with water and extracted with ether. The ether extracts were dried and concentrated and the product converted to the hydrochloride salt, giving 1.6 g. of 8-(2-phenylethyl)nor-α-ecgonine methyl ester hydrochloride, M.P. 223–229° C. (dec.) (corr.) when recrystallized from an ethanol-ether mixture.

*Anal.*—Calcd. for $C_{17}H_{23}NO_3 \cdot HCl$: C, 62.66; H, 7.42; Cl, 10.88. Found: C, 62.40; H, 7.30; Cl, 10.80.

EXAMPLE 43

8-propargylnor-α-ecgonine methyl ester [V; R is $CH \equiv CCH_2$] can be prepared by replacement of the 2-phenylethyl bromide in Example 42 by a molar equivalent amount of propargyl bromide.

EXAMPLE 44

8 - [2 - (p - aminophenyl)ethyl]nor - α - ecgonine methyl ester [V; R is p-$H_2NC_6H_4CH_2CH_2$] can be prepared by replacement of the 2-phenylethyl bromide in Example 42 by a molar equivalent amount of 2-(p-aminophenyl)ethyl chloride.

EXAMPLE 45

8 - benzylnor - α - ecgonine methyl ester [V; R is $C_6H_5CH_2$] can be prepared by replacement of the 2-phenylethyl bromide in Example 42 by a molar equivalent amount of benzyl bromide.

EXAMPLE 46

8 - (3 - phenylpropyl)nor - α - ecgonine methyl ester [V; R is $C_6H_5CH_2CH_2CH_2$] can be prepared by replacement of the 2-phenylethyl bromide in Example 42 by a molar equivalent amount of 3-phenylpropyl chloride.

EXAMPLE 47

8 - [2 - (p - methoxyphenyl)ethyl]nor - α - ecgonine methyl ester [V; R is p-$CH_3OC_6H_4CH_2CH_2$] can be prepared by replacement of the 2-phenylethyl bromide in Example 42 by a molar equivalent amount of 2-(p-methoxyphenyl)ethyl chloride.

EXAMPLE 48

8 - [2 - (p - chlorophenyl)ethyl]nor - α - ecgonine methyl ester [V; R is p-$ClC_6H_4CH_2CH_2$] can be prepared by replacement of the 2-phenylethyl bromide in Example 42 by a molar equivalent amount of 2-(p-chlorophenyl) ethyl chloride.

EXAMPLE 49

*8-(2-Phenylethyl)-3-(Diphenylhydroxymethyl) Norpseudotropine Hydrochloride*

[VI; R is $C_6H_5CH_2CH_2$, R' is H]

A solution of 37 g. of 8-(2-phenylethyl)nor-α-ecgonine methyl ester (Example 42) in 500 ml. of ether was added to a stirred solution of phenyllithium (prepared from 157 g. of bromobenzene and 13.9 g. of lithium wire) in 1 liter of ether over a period of fifteen minutes. The mixture was stirred and refluxed for four hours and then stirred overnight at room temperature. The reaction mixture was worked up according to the manipulative procedure described above in Example 1, giving 40.5 g. of 8 - (2 - phenylethyl) - 3 - (diphenylhydroxymethyl) norpseudotropine hydrochloride, M.P. 271.5–274° C. (dec.) (corr.) after recrystallization from methanol-ether.

*Anal.*—Calcd. for $C_{28}H_{31}NO_2 \cdot HCl$: C, 74.73; H, 7.17; Cl, 7.89. Found: C, 74.88; H, 7.18; Cl, 7.67.

EXAMPLE 50

8 - propargyl - 3 - (diphenylhydroxymethyl)norpseudotropine [VI; R is $CH \equiv CCH_2$, R' is H] can be prepared by replacement of the 8-(2-phenylethyl)nor-α-ecgonine methyl ester in Example 49 by a molar equivalent amount of 8-propargylnor-α-ecgonine methyl ester.

EXAMPLE 51

8 - [2 - (p - aminophenyl)ethyl] - 3 - (diphenylhydroxymethyl) norpseudotropine [VI; R is $p\text{-}H_2NC_6H_4CH_2CH_2$, R' is H]

can be prepared by replacement of the 8-(2-phenylethyl) nor-α-ecgonine methyl ester in Example 49 by a molar equivalent amount of 8-[2-(p-aminophenyl)ethyl]nor-α-ecgonine methyl ester.

EXAMPLE 52

8 - benzyl - 3 - (diphenylhydroxymethyl)norpseudotropine [VI; R is $C_6H_5CH_2$, R' is H] can be prepared by replacement of the 8-(2-phenylethyl)nor-α-ecgonine methyl ester in Example 49 by a molar equivalent amount of 8-benzylnor-α-ecgonine methyl ester.

EXAMPLE 53

8 - (3 - phenylpropyl) - 3 - (diphenylhydroxymethyl) norpseudotropine [VI; R is $C_6H_5CH_2CH_2CH_2$, R' is H] can be prepared by replacement of the 8-(2-phenylethyl) nor-α-ecgonine methyl ester in Example 49 by a molar equivalent amount of 8-(3-phenylpropyl)nor-α-ecgonine methyl ester.

EXAMPLE 54

8-[2-(p - methoxyphenyl)ethyl] - 3 - (diphenylhydroxymethyl)norpseudotropine [VI; R is $p\text{-}CH_3OC_6H_4CH_2CH_2$, R' is H] can be prepared by replacement of the 8-(2-phenylethyl)nor-α-ecgonine methyl ester in Example 49 by a molar equivalent amount of 8-[2-(p-methoxyphenyl)ethyl]nor-α-ecgonine methyl ester.

EXAMPLE 55

8-[2-(p-chlorophenyl)ethyl]-3 - (diphenylhydroxymethyl)norpseudotropine [VI; R is $p\text{-}ClC_6H_4CH_2CH_2$, R' is H] can be prepared by replacement of the 8-(2-phenylethyl)nor-α-ecgonine methyl ester in Example 49 by a molar equivalent amount of 8-[2-(p-chlorophenyl)ethyl]nor-α-ecgonine methyl ester.

EXAMPLE 56

*8-(2-Phenylethyl)-3-Phenyl-3-Benzoylnortropane*

[VIII; R is $C_6H_5CH_2CH_2$, R' is H]

A stirred suspension of 35.5 g. of 8-(2-phenylethyl)-3-(diphenylhydroxymethyl)norpseudotropine hydrochloride (Example 49) in 250 ml. of acetic anhydride was treated all at once with 35.5 g. of fused, powdered zinc chloride, and the mixture was stirred at room temperature for twenty hours. The reaction mixture was worked up according to the manipulative procedure described above in Example 3, giving 28.0 g. of 8-(2-phenylethyl)-3-phenyl-3-benzoylnortropane in the form of an oil, which after crystallization and recrystallization from hexane was obtained in the form of colorless needles, M.P. 112–114° C. (uncorr.).

*Anal.*—Calcd. for $C_{28}H_{29}NO$: N, 3.54. Found: N, 3.53.

The hydrochloride salt of 8-(2-phenylethyl)-3-phenyl-3-benzoylnortropane was prepared in the usual manner by treatment of an ethereal solution of the free base with an excess of ethanolic hydrogen chloride. The hydrochloride had the M.P. 266–267° C. (dec.) (uncorr.) when recrystallized from absolute ethanol.

*Anal.*—Calcd. for $C_{28}H_{29}NO \cdot HCl$: C, 77.85; H, 7.00; Cl, 8.21. Found: C, 77.80; H, 6.68; Cl, 8.13.

EXAMPLE 57

8-propargyl-3-phenyl-3-benzoylnortropane [VIII; R is $CH \equiv CCH_2$, R' is H] can be prepared by replacement of the 8-(2 - phenylethyl) - 3 - (diphenylhydroxymethyl)norpseudotropine hydrochloride in Example 56 by a molar equivalent amount of 8-propargyl - 3 - (diphenylhydroxymethyl)norpseudotropine.

EXAMPLE 58

8-[2-(p-aminophenyl)ethyl]-3-phenyl - 3 - benzoylnortropane [VIII; R is $p\text{-}H_2NC_6H_4CH_2CH_2$, R' is H] can be prepared by replacement of the 8-(2-phenylethyl)-3-(diphenylhydroxymethyl)norpseudotropine hydrochloride in Example 56 by a molar equivalent amount of 8-[2-(p-aminophenyl)-ethyl]-3 - (diphenylhydroxymethyl)norpseudotropine.

EXAMPLE 59

8-benzyl - 3 - phenyl - 3 - benzoylnortropane [VIII; R is $C_6H_5CH_2$, R' is H] can be prepared by replacement of the 8-(2-phenylethyl) - 3 - (diphenylhydroxymethyl)norpseudotropine hydrochloride in Example 56 by a molar equivalent amount of 8-benzyl-3-(diphenylhydroxymethyl)norpseudotropine.

EXAMPLE 60

8-(3-phenylpropyl) - 3 - phenyl - 3 - benzoylnortropane [VIII; R is $C_6H_5CH_2CH_2CH_2$, R' is H] can be prepared by replacement of the 8-(2-phenylethyl)-3-(diphenylhydroxymethyl)norpseudotropine hydrochloride in Example 56 by a molar equivalent amount of 8-(3-phenylpropyl)-3-(diphenylhydroxymethyl)norpseudotropine.

EXAMPLE 61

8-[2-(p-methoxyphenyl)ethyl]-3 - phenyl - 3 - benzoylnortropane [VIII; R is $p\text{-}CH_3OC_6H_4CH_2CH_2$, R' is H] can be prepared by replacement of the 8-(2-phenylethyl)-3 -(diphenylhydroxymethyl)norpseudotropine hydrochloride in Example 56 by a molar equivalent amount of 8 - [2 - (p - methoxyphenyl)ethyl] - 3 - (diphenylhydroxymethyl)norpseudotropine.

EXAMPLE 62

8-[2-(p-chlorophenyl)ethyl]-3-phenyl - 3 - benzoylnortropane [VIII; R is $p\text{-}ClC_6H_4CH_2CH_2$, R' is H] can be prepared by replacement of the 8-(2-phenylethyl)-3-(diphenylhydroxymethyl)norpseudotropine hydrochloride in Example 56 by a molar equivalent amount of 8-[2-(p-chlorophenyl)ethyl] - 3 - (diphenylhydroxymethyl)norpseudotropine.

EXAMPLE 63

*8-(2-Phenylethyl)-3-Phenyl-3-(Phenylisonitrosomethyl) Nortropane Hydrochloride*

[IX; R is $C_6H_5CH_2CH_2$, R' is H]

A mixture of 2.0 g. of 8-(2-phenylethyl)-3-phenyl-3- benzoylnortropane hydrochloride (Example 56), 2.0 g. of hydroxylamine hydrochloride, 10 ml. of pyridine and 50 ml. of absolute ethanol was refluxed for fifteen hours. The crystalline material which had separated was collected by filtration and washed with water and with alcohol, giving 1.8 g. of 8-(2-phenylethyl)-3-phenyl-3-(phenylisonitrosomethyl)nortropane hydrochloride, M.P. 313–315° C. (uncorr.) when recrystallized from dimethylformamide.

Anal.—Calcd. for $C_{28}H_{30}N_2O \cdot HCl$: C, 75.23; H, 6.99; Cl, 7.93. Found: C, 75.40; H, 6.68; Cl, 7.91.

EXAMPLE 64

8-propargyl-3-phenyl-3-(phenylisonitrosomethyl)nortropane [IX; R is $CH \equiv CCH_2$, R' is H] can be prepared by replacement of the 8-(2-phenylethyl)-3-phenyl-3-benzoylnortropane hydrochloride in Example 63 by a molar equivalent amount of 8-propargyl-3-phenyl-3-benzoylnortropane.

EXAMPLE 65

8-[2-(p-aminophenyl)ethyl]-3-phenyl-3-(phenylisonitrosomethyl)nortropane [IX; R is $p-H_2NC_6H_4CH_2CH_2$, R' is H] can be prepared by replacement of the 8-(2-phenylethyl)-3-phenyl-3-benzoylnortropane hydrochloride in Example 63 by a molar equivalent amount of 8-[2-(p-aminophenyl)ethyl]-3-phenyl-3-benzoylnortropane.

EXAMPLE 66

8-benzyl-3-phenyl-3-(phenylisonitrosomethyl)nortropane [IX; R is $C_6H_5CH_2$, R' is H] can be prepared by replacement of the 8-(2-phenylethyl)-3-phenyl-3-benzoylnortropane hydrochloride in Example 63 by a molar equivalent amount of 8-benzyl-3-phenyl-3-benzoylnortropane.

EXAMPLE 67

8-(3-phenylpropyl)-3-phenyl-3-(phenylisonitrosomethyl)nortropane [IX; R is $C_6H_5CH_2CH_2CH_2$, R' is H] can be prepared by replacement of the 8-(2-phenylethyl)-3-phenyl-3-benzoylnortropane hydrochloride in Example 63 by a molar equivalent amount of 8-(3-phenylpropyl)-3-phenyl-3-benzoylnortropane.

EXAMPLE 68

8-[2-(p-methoxyphenyl)ethyl]-3-phenyl-3-(phenylisonitrosomethyl)nortropane [IX; R is $p-CH_3OC_6H_4CH_2CH_2$, R' is H] can be prepared by replacement of the 8-(2-phenylethyl)-3-phenyl-3-benzoylnortropane hydrochloride in Example 63 by a molar equivalent amount of 8-[2-(p-methoxyphenyl)ethyl]-3-phenyl-3-benzoylnortropane.

EXAMPLE 69

8-[2-(p-chlorophenyl)ethyl]-3-phenyl-3-(phenylisonitrosomethyl)nortropane [IX; R is $p-ClC_6H_4CH_2CH_2$, R' is H] can be prepared by replacement of the 8-(2-phenylethyl)-3-phenyl-3-benzoylnortropane hydrochloride in Example 63 by a molar equivalent amount of 8-[2-(p-chlorophenyl)ethyl]-3-phenyl-3-benzoylnortropane.

EXAMPLE 70

8-(2-Phenylethyl)-3-Phenyl-3-Carboxynortropane Hydrochloride

[X; R is $C_6H_5CH_2CH_2$ R' is H]

A suspension of 6 g. of 8-(2-phenylethyl)-3-phenyl-3-(phenylisonitrosomethyl)nortropane hydrochloride (Example 63) and 75 ml. of acetic acid was saturated with dry hydrogen chloride at 0° C. The reaction mixture was enclosed in a pressure bottle and heated on a steam bath for fifteen hours. The mixture was worked up according to the manipulative procedure described above in Example 5 giving 4.6 g. of 8-(2-phenylethyl)-3-phenyl-3-carboxynortropane hydrochloride, M.P. 224–224.5° C. (uncorr.) when recrystallized from a methanol-ether mixture.

Anal.—Calcd. for $C_{22}H_{25}NO_2 \cdot HCl$: C, 71.05; H, 7.05; Cl, 9.53; N, 3.77. Found: C, 70.87; H, 6.99; Cl, 9.37; N, 3.81.

EXAMPLE 71

8-propargyl-3-phenyl-3-carboxynortropane [X; R is $CH \equiv CCH_2$ R' is H] can be prepared by replacement of the 8-(2-phenylethyl)-3-phenyl-3-(phenylisonitrosomethyl)nortropane hydrochloride in Example 70 by a molar equivalent amount of 8-propargyl-3-phenyl-3-(phenylisonitrosomethyl)nortropane.

EXAMPLE 72

8-[2-(p-aminophenyl)ethyl]-3-phenyl-3-carboxynortropane [X; R is $p-H_2NC_6H_4CH_2CH_2$, R' is H] can be prepared by replacement of the 8-(2-phenylethyl)-3-phenyl-3-(phenylisonitrosomethyl)nortropane hydrochloride in Example 70 by a molar equivalent amount of 8-[2-(p-aminophenyl)ethyl]-3-phenyl-3-(phenylisonitrosomethyl)nortropane.

EXAMPLE 73

8-benzyl-3-phenyl-3-carboxynortropane [X; R is $C_6H_5CH_2$, R' is H] can be prepared by replacement of the 8-(2-phenylethyl)-3-phenyl-3-(phenylisonitrosomethyl)nortropane hydrochloride in Example 70 by a molar equivalent amount of 8-benzyl-3-phenyl-3-(phenylisonitrosomethyl)nortropane.

EXAMPLE 74

8-(3-phenylpropyl)-3-phenyl-3-carboxynortropane [X; R is $C_6H_5CH_2CH_2CH_2$, R' is H] can be prepared by replacement of the 8-(2-phenylethyl)-3-phenyl-3-(phenylisonitrosomethyl)nortropane hydrochloride in Example 70 by a molar equivalent amount of 8-(3-phenylpropyl)-3-phenyl-3-(phenylisonitrosomethyl)nortropane.

EXAMPLE 75

8-[2-(p-methoxyphenyl)ethyl]-3-phenyl-3-carboxynortropane [X; R is $p-CH_3OC_6H_4CH_2CH_2$, R' is H] can be prepared by replacement of the 8-(2-phenylethyl)-3-phenyl-3-(phenylisonitrosomethyl)nortropane hydrochloride in Example 70 by a molar equivalent amount of 8-[2-(p-methoxyphenyl)ethyl]-3-phenyl-3-(phenylisononitrosomethyl)nortropane.

EXAMPLE 76

8-[2-(p-chlorophenyl)ethyl]-3-phenyl-3-carboxynortropane [X; R is $p-ClC_6H_4CH_2CH_2$, R' is H] can be prepared by replacement of the 8-(2-phenylethyl)-3-phenyl-3-(phenylisonitrosomethyl)nortropane hydrochloride in Example 70 by a molar equivalent amount of 8-[2-(p-chlorophenyl)ethyl]-3-phenyl-3-(phenylisonitrosomethyl)nortropane.

EXAMPLE 77

8-(2-Phenylethyl)-3-Phenyl-3-Carbethoxynortropane Hydrochloride

[I; R is $C_6H_5CH_2CH_2$, R' is H, R'' is $C_2H_5$]

A mixture of 3.3 g. of 8-(2-phenylethyl)-3-phenyl-3-carboxynortropane hydrochloride (Example 70) and 100 ml. of absolute ethanol was saturated with dry hydrogen chloride at 0° C. and kept at room temperature for six days. Evaporation of the solvent and recrystallization of the residue from a methanol-ether mixture, using activated charcoal for decolorizing purposes, gave 2.3 g. of 8-(2-phenylethyl)-3-phenyl-3-carbethoxynortropane hydrochloride, M.P 198–199.5° C. (corr.).

Anal.—Calcd. for $C_{24}H_{29}NO_2 \cdot HCl$: C, 72.07; H, 7.56; Cl, 8.87. Found: C, 72.07; H, 7.55; Cl, 9.05.

EXAMPLE 78

8-Cinnamylnor-α-Ecgonine Methyl Ester p-Toluenesulfonate

[V; R is $C_6H_5CH=CHCH_2$, lower-alkyl is $CH_3$]

A mixture of 6.0 g. of nor-α-ecgonine methyl ester (Example 21), 6.4 g. of cinnamyl bromide, 3.2 g. of potassium acetate and 50 ml. of n-butyl alcohol was refluxed for two and one-half hours. The reaction mixture was worked up according to the manipulative procedure described above in Example 42. The product was isolated in the free base form as an oil which was dissolved in acetone and treated with a slight excess of p-toluenesulfonic acid in ethanol, giving 6.0 g. of 8-cinnamylnor-α-ecgonine methyl ester p-toluenesulfonate, M.P. 201–202° C., after two recrystallizations from isopropyl alcohol.

*Anal.*—Calcd. for $C_{18}H_{23}NO_3 \cdot C_7H_8SO_3$: C, 63.40; H, 6.60; S, 6.77. Found: C, 63.58; H, 6.79; S, 6.97.

EXAMPLE 79

3-Phenyl-3-(Phenylhydroxymethyl)Tropane
[XI; R is $CH_3$, R' is H]

(A) BY LITHIUM ALUMINUM HYDRIDE REDUCTION OF 3-PHENYL-3-BENZOYLTROPANE

To a warm, stirred suspension of 0.5 g. of lithium aluminum hydride in 75 ml. of ether was added all at once 2.0 g. of 3-phenyl-3-benzoyltropane (Example 3) in 100 ml. of ether, and the mixture was refluxed for six hour. The mixture was cooled, and the excess lithium aluminum hydride was decomposed by dropwise addition of 1 ml. of water followed by 1 ml. of 35% sodium hydroxide solution. The solid material which had formed was collected by filtration and extracted once with boiling chloroform. The chloroform extracts were dried and concentrated, giving 2.1 g. of 3-phenyl-3-(phenylhydroxymethyl)tropane, M.P. 160–161° C. (corr.) when recrystallized from carbon tetrachloride.

*Anal.*—Calcd. for $C_{21}H_{25}NO$: C, 82.01; H, 8.20; N, 4.56. Found: C, 82.36; H, 8.55; N, 4.52.

The methiodide salt of 3-phenyl-3-(phenylhydroxymethyl)tropane was prepared by treatment of an acetonitrile solution of the free base with an excess of methyl iodide. The methiodide had the M.P. 280–282.5° C. (corr.).

*Anal.*—Calcd. for $C_{22}H_{28}NOI$: C, 58.80; H, 6.28; I, 28.24. Found: C, 58.85; H, 6.01; I, 28.10.

The methiodide of 3-phenyl-3-(phenylhydroxymethyl)-tropane was found to have an anticholinergic activity 3.8% that of atropine sulfate. Its intravenous toxicity in mice ($ALD_{50}$) was 8.0 mg./kg. of body weight.

(B) BY CATALYTIC HYDROGENATION OF 3-PHENYL-3-BENZOYLTROPANE

A solution of 8.8 g. of 3-phenyl-3-benzoyltropane in 225 ml. of ethanol was shaken with 0.6 g. of platinum oxide catalyst and hydrogen at room temperature until one equivalent of hydrogen was taken up. The catalyst was removed by filtration, the filtrate evaporated to dryness and the residue recrystallized from acetone, giving 6.5 g. of 3-phenyl-3-(phenylhydroxymethyl)tropane.

EXAMPLE 80

3-Carbamylpseudotropine
[XII; R is $CH_3$]

To a solution of sodium amide, which had been prepared from 14 g. of sodium and a few crystals of ferric nitrate in 1 liter of liquid ammonia, was added 20 g. of α-ecgonine methyl ester. The reaction mixture was stirred at room temperature until the ammonia had evaporated, and the residue was decomposed by dropwise addition of 120 ml. of water. The aqueous phase was saturated with solid potassium carbonate and extracted several times with methylene chloride. The combined extracts were dried over anhydrous sodium sulfate and concentrated to give a colorless crystalline residue. The residue was triturated with 150 ml. of absolute ether to give 16.0 g. of 3-carbamylpseudotropine, M.P. 155.8–159.2° C. (corr.).

*Anal.*—Calcd. for $C_9H_{16}N_2O_2$: C, 58.68; H, 8.76; N, 15.21. Found: C, 58.85; H, 8.69; N, 15.19.

EXAMPLE 81

3-Propionylpseudotropine
[XIII; R is $CH_3$, R''' is $C_2H_5$]

To a stirred solution of ethylmagnesium bromide, prepared from 368 g. of ethyl bromide and 82.2 g. of magnesium in 2 liters of ether, was added a solution of 62.1 g. of 3-carbamylpseudotropine in 500 ml. of tetrahydrofuran. The resulting mixture was stirred and refluxed for fifteen hours and then decomposed by the dropwise addition of 340 ml. of concentrated hydrochloric acid. After standing for three hours at room temperature, the aqueous phase was made basic with an excess of solid potassium carbonate, and the solid which precipitated was collected by filtration and extracted twice with 3 liter portions of boiling chloroform. The aqueous filtrate was extracted five times with chloroform. The combined chloroform extracts were dried over anhydrous sodium sulfate and concentrated to yield 72 g. of crystalline solid. The latter was extracted with 1.5 liters of boiling hexane, and concentration of the extracts and cooling caused separation of 29.5 g. of 3-propionylpseudotropine, M.P. 120.6–123.4° C. (corr.) when recrystallized from hexane.

*Anal.*—Calcd. for $C_{11}H_{19}NO_2$: C, 66.97; H, 9.71; N, 7.10. Found: C, 67.29; H, 9.61; N, 6.94.

EXAMPLE 82

3-(Ethylphenylhydroxymethyl)Pseudotropine Hydrochloride
[XIV; R is $CH_3$, R' is H, R''' is $C_2H_5$]

To a solution of phenyllithium, prepared from 31.4 g. of bromobenzene and 2.8 g. of lithium wire in 500 ml. of ether, was added all at once a warm solution of 4.0 g. of 3-propionylpseudotropine in 150 ml. of tetrahydrofuran. After stirring and refluxing for one and one-half hours, the reaction mixture was cooled and hydrolyzed by the addition of 150 ml. of water. The aqueous phase was extracted twice with ether, and the ether extracts were dried over anhydrous sodium sulfate and concentrated to dryness in vacuo. The residue was dissolved in methylene dichloride, the solution dried over anhydrous sodium sulfate and concentrated to give 6.5 g. of a light yellow oil which crystallized upon standing at room temperature. The latter was dissolved in acetone and a slight excess of alcoholic hydrogen chloride was added. The salt which separated was collected by filtration, giving 5.0 g. of 3-(ethylphenylhydroxymethyl)pseudotropine hydrochloride, M.P. 212.4–213.8° C. (corr.) when recrystallized from a methanol-ether mixture.

*Anal.*—Calcd. for $C_{17}H_{25}NO_2 \cdot HCl$: C, 65.48; H, 8.40; Cl, 11.38. Found: C, 65.59; H, 8.44; Cl, 11.23.

EXAMPLE 83

3-Phenyl-3-Propionyltropane Hydrochloride
[XV; R is $CH_3$, R' is H, R''' is $C_2H_5$]

A solution of 3.3 g. of 3-(ethylphenylhydroxymethyl)-pseudotropine hydrochloride and 15 g. of fused, powdered zinc chloride in 30 ml. of acetic anhydride was stirred at room temperautre for fifteen hours. The reaction mixture was poured into an excess of cold aqueous sodium hydroxide and the product was extracted with methylene dichloride. The extracts were dried and concentrated, and the residue was dissolved in 30 ml. of acetone and treated with an excess of alcoholic hydrogen chloride, wheerupon there separated 2.2 g. of 3-phenyl-3-propionyltropane hydrochloride, M.P. 273.2–275.8° C. (corr.) when recrystallized from a methanol-ether mixture.

*Anal.*—Calcd. for $C_{17}H_{23}NO \cdot HCl$: C, 69.49; H, 8.23; Cl, 12.07. Found: C, 69.26; H, 8.06; Cl, 12.02.

EXAMPLE 84

3-phenyl-3-(1-isonitrosopropyl)tropane [XVI; R is $CH_3$, R' is H, R''' is $C_2H_5$] can be prepared by heating a solution of 3-phenyl-3-propionyltropane hydrochloride with hydroxylamine hydrochloride in a pyridine-ethanol solution according to the manipulative procedure described above in Example 4.

EXAMPLE 85

3-phenyl-3-carboxytropane hydrochloride [X; R is $CH_3$, R' is H, β-series] can be prepared by heating 3-phenyl-3-(1-isonitrosopropyl)tropane hydrochloride with acetic acid saturated with hydrogen chloride according to the manipulative procedure described above in Example 5. The product obtained is identical with that obtained in Example 5.

EXAMPLE 86

*3-[Ethyl(m-Anisyl)Hydroxymethyl]Pseudotropine Hydrochloride*

[XIV; R is $CH_3$, R' is $OCH_3$, R''' is $C_2H_5$]

To a stirred solution of m-anisylmagnesium bromide prepared from 118 g. of m-bromoanisole and 15.3 g. of magnesium in 1 liter of ether under nitrogen was rapidly added a solution of 15.0 g. of 3-propionylpseudotropine in 250 ml. of tetrahydrofuran. The reaction mixture was refluxed and stirred for three hours, left at room temperature for fifteen hours and then poured into a cold solution of 66 ml. of concentrated hydrochloric acid in 400 ml. of water. The aqueous phase was made basic with solid potassium carbonate, and the inorganic salts were removed by filtration and washed with methylene dichloride. The filtrate was extracted with methylene dichloride and the combined methylene dichloride washings and extracts were dried and concentrated in vacuo. The residue was dissolved in acetone and treated with an excess of ethanolic hydrogen chloride whereupon there separated 14.5 g. of 3-[ethyl(m-anisyl)hydroxymethyl]-pseudotropine hydrochloride, M.P. 245–245.5° C. (dec.) (uncorr.) after recrystallization from a methanol-ether mixture.

*Anal.*—Calcd. for $C_{18}H_{27}NO_3 \cdot HCl$: C, 63.23; H, 8.25; Cl, 10.37. Found: C, 63.59; H, 8.17; Cl, 10.15.

EXAMPLE 87

3-(m-anisyl)-3-propionyltropane hydrochloride [XV; R is $CH_3$, R' is $OCH_3$, R''' is $C_2H_5$] was prepared from 14.2 g. of 3-[ethyl(m-anisyl)hydroxymethyl]pseudotropine hydrochloride and 28.4 g. of zinc chloride in 280 ml. of acetic anhydride according to the manipulative procedure described above in Example 83. There was thus obtained 7.9 g. of 3-(m-anisyl)-3-propionyltropane hydrochloride, M.P. 237.5–238.5°C. (uncorr.) when recrystallized first from a methanol-ether mixture and then from an isopropyl alcohol-ether mixture.

*Anyl.*—Calcd. for $C_{18}H_{25}NO_2 \cdot HCl$: C, 66.75; H, 8.09; Cl, 10.95. Found: C, 66.94; H, 8.07; Cl, 10.97.

EXAMPLE 88

3-(m-anisyl)-3-(1-isonitrosopropyl)tropane hydrochloride [XVI; R is $CH_3$, R' is $OCH_3$, R''' is $C_2H_5$] can be prepared by heating 3-(m-anisyl)-3-propionyltropane hydrochloride and hydroxylamine hydrochloride in pyridine-ethanol solution according to the manipulative procedure described above in Example 4.

EXAMPLE 89

3-(m-anisyl)-3-carboxytropane hydrochloride [X; R is $CH_3$, R' is $OCH_3$] can be prepared by heating 3-(m-anisyl)-3 - (1 - isonitrosopropyl)tropane hydrochloride in acetic acid saturated with hydrogen chloride according to the manipulative procedure described above in Example 15. The product obtained is identical with that obtained in Example 15.

EXAMPLE 90

*3-(m-Hydroxyphenyl)-3-Propionyltropane Hydrochloride*
[XV; R is $CH_3$, R' is OH, R''' is $C_2H_5$]

A solution of 1 g. of 3-(m-anisyl)-3-propionyltropane hydrochloride in 25 ml. of 48% aqueous hydrobromic acid was refluxed for twenty minutes under nitrogen. The reaction mixture was concentrated to dryness in vacuo, and the residue was dissolved in 100 ml. of water. The latter solution was made basic by addition of 4 ml. of 35% sodium hydroxide solution and extracted with ether. The aqueous phase was acidified with concentrated hydrochloric acid and then saturated with solid potassium carbonate. The resulting mixture was extracted with chloroform, and the chloroform extracts were dried and concentrated. The residue was dissolved in acetone, decolorized with activated charcoal and treated with ethanolic hydrogen chloride, whereupon there separated 0.78 g. of 3-(m-hydroxypheny)-3-propionyltropane hydrochloride, M.P. 274.2–275.8° C. (corr.) when recrystallized from an ethanol-ether mixture.

*Anal.*—Calcd. for $C_{17}H_{23}NO_2 \cdot HCl$: C, 65.90; H, 7.81; Cl, 11.44. Found: C, 66.23; H, 7.81; Cl, 11.25.

This application is a division of our copending application, Serial No. 731,857, filed April 30, 1958.

We claim:

1. A compound selected from the group consisting of (A) compounds having the formula

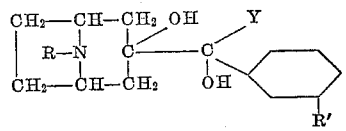

wherein R is a member of the group consisting of hydrogen, lower-aliphatic hydrocarbon, monocarbocyclic aryl-lower-aliphatic hydrocarbon, and monocarbocyclic arylamino - lower - aliphatic hydrocarbon, the monocarbocyclic aryl in each instance being selected from the group consisting of phenyl and phenyl substituted by from one to three substituents selected from the group consisting of hydroxy, fluoro, chloro, bromo, iodo, nitro, amino, lower-alkoxy and lower-alkylamino; R' is a member of the group consisting of hydrogen and lower-alkoxy; and Y is a member of the group consisting of 3-R'-phenyl and lower-alkyl; (B) acid-addition salts thereof; and (C) lower-alkyl, lower-alkenyl and monocarbocyclic aryl-lower-alkyl quaternary ammonium salts thereof.

2. 3-(diphenylhydroxymethyl)pseudotropine.
3. An acid-addition salt of 3-(diphenylhydroxymethyl)pseudotropine.
4. 3-[di(m-anisyl)hydroxymethyl]pseudotropine.
5. An acid-addition salt of 3-(diphenylhydroxymethyl)norpseudotropine.
6. An acid-addition salt of 8-(2-phenylethyl)-3-diphenylhydroxymethyl)norpseudotropine.
7. 3-(ethylphenylhydroxymethyl)pseudotropine.
8. 3-[ethyl-(3-methoxyphenyl)hydroxymethyl]pseudotropine.
9. The process for preparing a compound having the formula

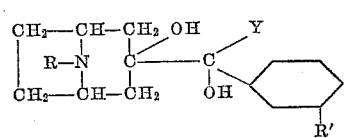

which comprises reacting a 3-hydroxy-3-carbo-lower-alkoxy-8-R-nortropane of the formula

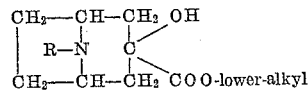

with a compound selected from the group consisting of phenyllithium and 3-R'-phenylmagnesium halide, wherein R is a member of the group consisting of hydrogen, lower-aliphatic hydrocarbon, monocarbocyclic aryl-lower-aliphatic hydrocarbon, and monocarbocyclic arylamino-lower-aliphatic hydrocarbon, the monocarbocyclic aryl in each instance being selected from the group consisting of phenyl and phenyl substituted by from one to three substituents selected from the group consisting of hydroxy, fluoro, chloro, bromo, iodo, nitro, amino, lower-alkoxy and lower-alkylamino; R' is a member of the group consisting of hydrogen and lower-alkoxy; and Y is 3-R'-phenyl.

10. The process for preparing a compound having the formula

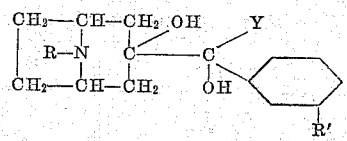

which comprises reacting a 3-hydroxy-3-lower-alkanoyl-8-R-nortropane of the formula

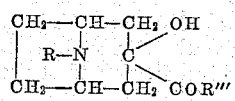

with a compound selected from the group consisting of phenyllithium and 3-R'-phenylmagnesium halide, wherein R is a member of the group consisting of hydrogen, lower-aliphatic hydrocarbon, monocarbocyclic aryl-lower-aliphatic hydrocarbon, and monocarbocyclic aryl-amino-lower-aliphatic hydrocarbon, the monocarbocyclic aryl in each instance being selected from the group consisting of phenyl and phenyl substituted by from one to three substituents selected from the group consisting of hydroxy, fluoro, chloro, bromo, iodo, nitro, amino, lower-alkoxy and lower-alkylamino; R' is a member of the group consisting of hydrogen and lower-alkoxy; Y is lower-alkyl; and R''' is lower-alkyl.

11. The process for preparing 3-(diphenylhydroxymethyl)pseudotropine which comprises reacting α-ecgonine lower-alkyl ester with phenyllithium, and hydrolyzing the intermediate organometallic complex.

References Cited in the file of this patent
UNITED STATES PATENTS
2,800,480    Zirkle _____ July 23, 1957
FOREIGN PATENTS
644,115    Great Britain _____ Oct. 4, 1950
OTHER REFERENCES
Cope et al.: J. Am. Chem. Soc., Vol. 73, pages 3419–3424 (1951).

UNITED STATES PATENT OFFICE
CERTIFICATE OF CORRECTION

Patent No. 3,073,829                    January 15, 1963

Sydney Archer et al.

It is hereby certified that error appears in the above numbered patent requiring correction and that the said Letters Patent should read as corrected below.

Column 1, lines 22 to 27, the formula should appear as shown below instead of as in the patent:

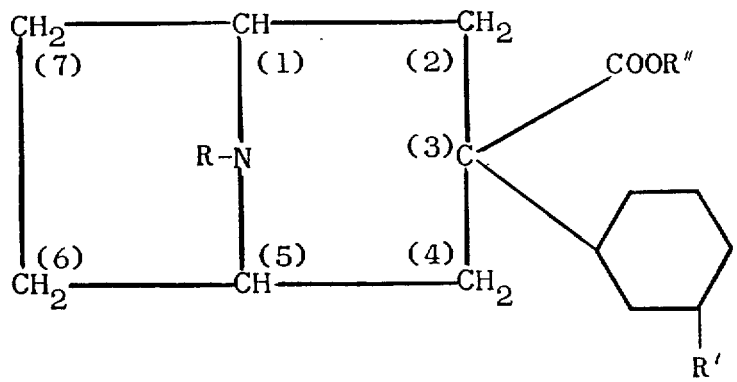

column 2, lines 35 to 38, formula IV should appear as shown below instead of as in the patent:

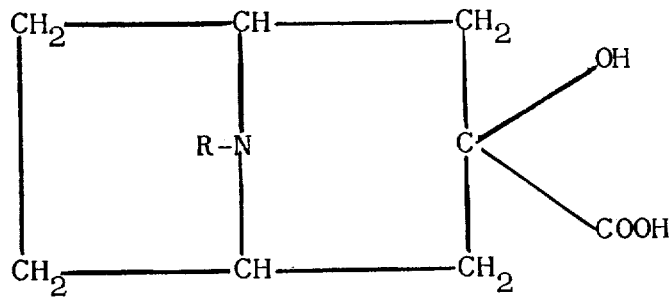

column 5, line 19, for "XVIII" read -- VIII --; column 8, line 44, for "$C_{21}H_{25}NO$:" read -- $C_{21}H_{23}NO$: --; column 13, line 25, for "benzyl" read -- benzoyl --.

Signed and sealed this 17th day of December 1963.

(SEAL)
Attest:
ERNEST W. SWIDER

Attesting Officer

EDWIN L. REYNOLDS
Acting Commissioner of Patents